UNITED STATES PATENT OFFICE.

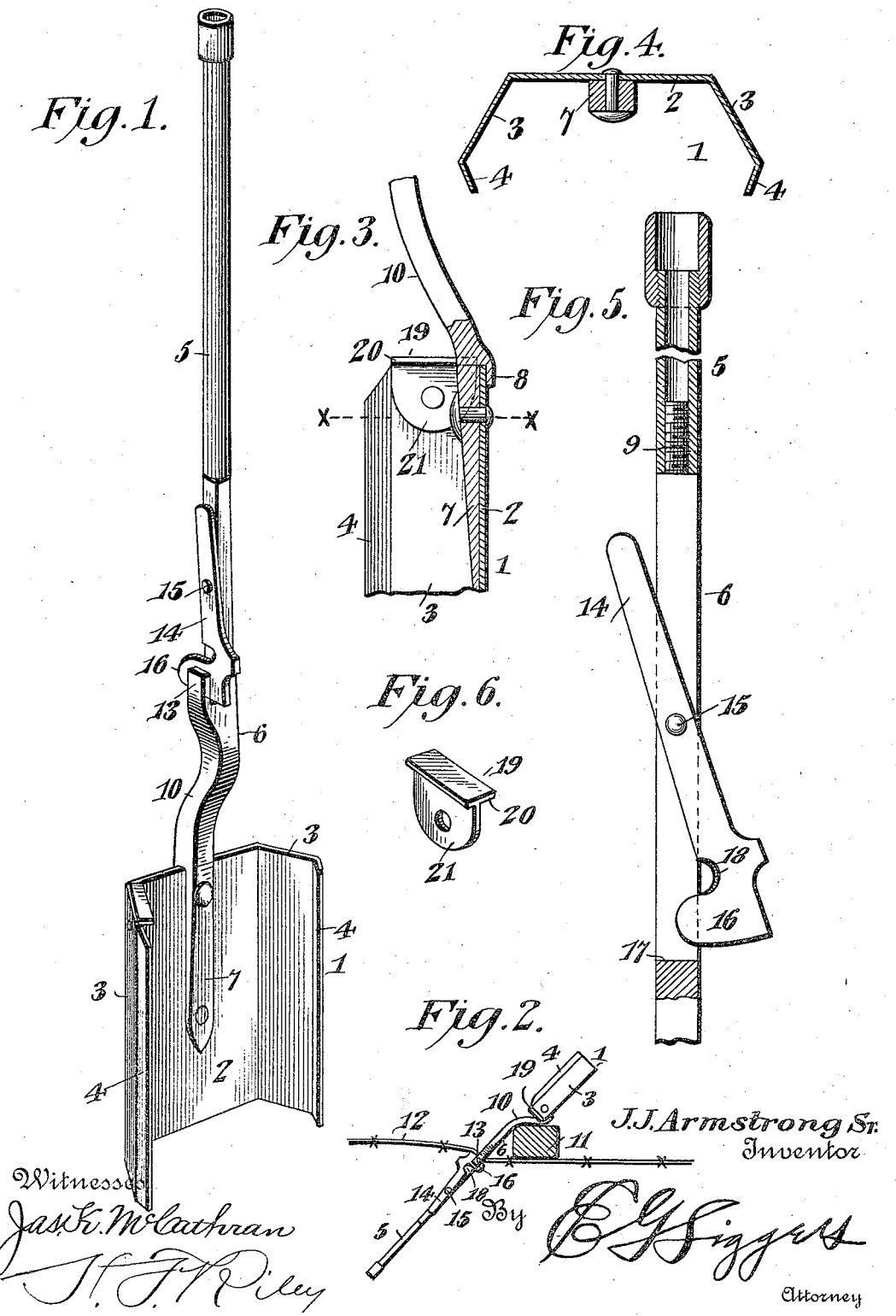

JOHN JOSHUA ARMSTRONG, SR., OF WEIMAR, TEXAS.

COMBINED POST-HOLE DIGGER AND WIRE-STRETCHER.

No. 896,345.        Specification of Letters Patent.        Patented Aug. 18, 1908.

Application filed July 16, 1907. Serial No. 384,001.

*To all whom it may concern:*

Be it known that I, JOHN JOSHUA ARMSTRONG, Sr., a citizen of the United States, residing at Weimar, in the county of Colorado and State of Texas, have invented a new and useful Combined Post-Hole Digger and Wire-Stretcher, of which the following is a specification.

The invention relates to a combined post hole digger and wire stretcher.

The object of the present invention is to improve the construction of fence building tools, and to provide a simple, inexpensive and efficient combined post hole digger and wire stretcher of great strength and durability, capable of enabling barbed wire to be advantageously handled, and adapted to permit one person to stretch and fasten the same at a fence post.

A further object of the invention is to provide a tool of this character, adapted when digging a post hole to retain the earth and thereby enable the same to be readily removed from the post hole.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a combined post hole digger and wire stretcher, constructed in accordance with this invention. Fig. 2 is a plan view, illustrating the manner of stretching a fence wire. Fig. 3 is an enlarged detail sectional view, illustrating the manner of securing the shank of the handle to the shovel blade. Fig. 4 is a horizontal sectional view, taken substantially on the line *x—x* of Fig. 3. Fig. 5 is an enlarged detail view of a portion of the shank and the handle, illustrating the construction of the same and the wire stretching means carried thereby. Fig. 6 is a detail perspective view of the foot guard.

Like numerals of reference designate corresponding parts in all the figures of the drawing.

1 designates a shovel blade, consisting of a flat back 2 and angular sides, composed of inner diverging portions 3 and outer converging portions 4. The inner and outer portions of the sides form inner angular recesses, and the two sides are adapted to coöperate to retain the earth in the shovel to enable the former to be removed from a post hole. The tool is adapted to be jarred by striking it against the ground to empty it of its contents.

The handle 5 of the tool is connected with the shovel blade by means of a shank 6, provided with a lower straight attachment portion 7, which is secured by rivets, or other suitable fastening devices to the back of the shovel blade. The shank is provided at the upper or inner edge of the shovel blade with a longitudinally disposed flange or lip 8, spaced from the attachment portion 7 and engaging the rear face of the back 2 of the shovel blade. The flange or lip and the attachment portion form a recess to receive the upper edge of the back of the shovel blade, as clearly illustrated in Fig. 3 of the drawing. By this construction, the shovel blade is rigidly secured to the shank. Also the rear flange or lip forms a guard for preventing the shovel blade from being injured while stretching a fence wire. The handle 5, which is preferably constructed of tubular metal, is interiorly threaded at its attached end to receive the adjacent end 9 of the shank, which is reduced and threaded to fit in and engage the screw threads of the handle, as clearly shown in Fig. 5 of the drawing.

The shank 6 is provided at its intermediate portion with a forwardly extending bend 10, forming a rear seat, which is adapted to fit against a fence post 11, as clearly illustrated in Fig. 2 of the drawing to enable the device to be fulcrumed on the said post 11 for stretching a fence wire 12. The shank is provided adjacent to the intermediate bent portion and at one side of the latter with wire clamping means, consisting of a rigid jaw 13 and a pivoted clamping lever 14, fulcrumed at an intermediate point on the shank by means of a rivet 15, or other suitable fastening device, and provided with a wire engaging head 16. The fixed jaw consists of a laterally projecting recessed portion, forming a recess to receive the wire, and the head of the clamping lever, and providing a lug or projecting portion, spaced from the side of the shank and operating to brace and guide the clamping lever 14. The head 16 of the clamping lever 14 is provided with a curved edge, which coöperates with the end wall 17 of the recess of the fixed jaw to clamp the fence wire. The wire clamping lever 14 is also provided adjacent to its head with a notch 18, forming the cutting edge and arranged to coöperate with the adjacent side of the shank to form a wire cutter. The rear seat enables the device to be fulcrumed on a post at the rear face thereof, and the wire clamping means, which is spaced from the seat, is arranged to draw a wire opposite the front face of the post.

The device may be advantageously employed for handling barbed wire, and it will enable such wire to be stretched and fastened by one person. After the wire is stretched and the lever is in substantially the position illustrated in Fig. 2 of the drawing, the operator may hold it in such position by placing his body against the handle portion of the device. This will leave the hands of the operator free for stapling, or otherwise fastening the fence wire to the post.

The shovel blade is provided with a foot guard 19, consisting of a top flange or foot plate 20 and an attaching web or flange 21, connected with the top flange or foot plate between the side edges thereof and extending downwardly therefrom. The top flange or foot plate fits against the upper edge of the upper portion of one side of the shovel blade to enable the attachment portion to be secured to the shovel blade by a single fastening device.

Having thus fully described my invention, what I claim as new and desire to secure by Letters Patent, is:—

1. A combined post hole digger and wire stretcher comprising a shovel blade, a handle, a shank connecting the handle with the shovel blade and provided adjacent to the latter with a forwardly projecting bend forming a rear seat arranged to fit against and fulcrum the device on the rear face of a fence post, and wire clamping means mounted on the shank at one side thereof and spaced from the said seat and arranged to draw a wire across the front face of the post.

2. A combined post hole digger and wire stretcher comprising a shovel blade, a handle, a shank connecting the handle with the shovel blade and provided adjacent to the latter with a forwardly projecting bend forming a rear seat arranged to fit against and fulcrum the device on the rear face of a fence post, said shank being also provided at one side adjacent to the seat or bend with a rigid wire engaging jaw, and a pivoted clamping member mounted on the shank and coöperating with the jaw to clamp a wire, said jaw and clamping member being spaced from the seat and arranged to draw a wire across the front face of the post.

3. A combined post hole digger and wire stretcher comprising a shovel blade, a handle having a shank secured to the shovel blade and provided adjacent to the same with a forwardly extending bend forming a rear seat arranged to fit against and fulcrum the device on the rear face of a fence post, said shank being also provided at the back with a projecting lip or flange fitting over the upper edge of the shovel blade to form a guard for the same, and wire engaging means mounted on the shank near the inner end of the bent portion thereof and spaced from the seat and arranged to stretch a wire across the front face of the post.

In testimony, that I claim the foregoing as my own, I have hereto affixed my signature in the presence of two witnesses.

JOHN JOSHUA ARMSTRONG, Senior.

Witnesses:
    J. R. Gusman,
    W. E. Burfurd.